United States Patent [19]

Magor et al.

[11] Patent Number: 5,541,863
[45] Date of Patent: Jul. 30, 1996

[54] VIRTUAL INTEGRATED SOFTWARE TESTBED FOR AVIONICS

[75] Inventors: Wayne E. Magor, Iowa City; Ken M. Stodola, Cedar Rapids, both of Iowa

[73] Assignee: Rockwell International, Seal Beach, Calif.

[21] Appl. No.: 316,286

[22] Filed: Sep. 30, 1994

[51] Int. Cl.⁶ ................................................. G05B 17/02
[52] U.S. Cl. ...................... 364/580; 364/578; 364/424.06
[58] Field of Search ...................... 364/580, 578, 364/423, 424.01, 424.03–424.06; 434/14, 23, 35–44, 47–49, 59; 244/1 R, 194, 195

[56] References Cited

U.S. PATENT DOCUMENTS

| | | | |
|---|---|---|---|
| 5,111,402 | 5/1992 | Brooks et al. | 364/424.04 |
| 5,161,158 | 11/1992 | Chakravarty et al. | 371/15.1 |
| 5,184,312 | 2/1993 | Ellis | 364/580 |
| 5,260,874 | 11/1993 | Berner et al. | 364/424.06 |

OTHER PUBLICATIONS

Finley et al., Real time Avionics Processor Emulators, 1993, pp. 129–136.

*Primary Examiner*—Emanuel T. Voeltz
*Assistant Examiner*—Hal D. Wachsman
*Attorney, Agent, or Firm*—Gregory C. Williams; M. Lee Murrah; George A. Montanye

[57] ABSTRACT

A virtual integrated software testbed for avionics is disclosed which allows avionics software to be developed on a host computer using a collection of computer programs running simultaneously as processes and synchronized by a central process. The software testbed disclosed uses separate synchronized processes, permits signals from an avionics device to be generated by a simulation running on the host computer or from actual equipment and data bus signals coming from and going to actual avionics hardware is connected to their virtual bus counterparts in the host computer on a real-time basis.

2 Claims, 7 Drawing Sheets

```
                        L_MFD (BRT)
       ---------- PPOS MAP -------- 1/3
       DEPART  KCID    213 NM         12:04
       LAST    ALO     115 NM         12:25
       TO      CSH      74 NM  0:12   12:55
       NEXT    DBQ     208 NM  0:35   13:19
       DEST    KDBQ    208 NM  0:35   13:19
       ------------------------------------
        014 - MAP RANGE DISCRETE WORD
       RANGE 100
        364 - MAP MODE DISCRETE WORD
       PPOS MAP
        147 - MAP CENTER MAG VAR.
       EAST  -0.3
        264 - MAP REFERENCE LATITUDE
       N43270
        164 - MAP REFERENCE LONGITUDE
       W090049
        070 - 'TO' WAYPOINT
       N43594 W088334 OSH
        100 - ACTIVE FLIGHT PATH VECTORS
       N43594 W088334
       N41284 W095033
        034 - LEFT HOLDING PATTERN
       N42241 W090426 -136.5 WHI DBQ
        100 - ACTIVE FLIGHT PATH VECTORS
       ------------------------------------
```

*Fig. 3B*

V_ARINC

File  Edit  Commands  Options  Print                                                                          Help

| LINE  | LABEL | CH | P | A B C D E F | FORMATTED DATA                          | ENGINEERING DATA    | TIME    | ABS  |
|-------|-------|----|---|-------------|-----------------------------------------|---------------------|---------|------|
| +0088 | 115   | 1  | 0 | 110 0101    | 1000 0010 0010 0001                     | 61.9629 Deg         | 500.00  | MSEC |
| +0089 | 116   | 1  | 0 | 110 0000    | 0000 0000 1110 0001                     | 0.0273 NM           | 500.00  | MSEC |
| +0090 | 313   | 1  | 0 | 110 0101    | 1000 0111 1010 0001                     | 62.1826 Deg         | 500.00  | MSEC |
| +0091 | 321   | 1  | 0 | 110 0000    | 0000 0000 0000 0001                     | 0.0000 Deg          | 500.00  | MSEC |
| +0092 | 261   | 1  | 0 | 000 0000    | 0000 0100 1010 0001                     | N/A DISC            | 500.00  | MSEC |
| +0093 | 266   | 1  | 0 | 110 0000    | 0000 0000 0010 0001                     | N/A DISC            | 500.00  | MSEC |
| +0094 | 121   | 1  | 0 | 110 0000    | 0000 0001 1010 0001                     | 0.0714 Deg          | 500.00  | MSEC |
| +0095 | 107   | 1  | 0 | 010 0000    | 0000 0000 0000 0001                     | 0.0000 Feet         | 500.00  | MSEC |
| +0096 | 150   | 1  | 0 | 110 0000    | 12 26 50 001 –                          | N/A TIME            | 500.00  | MSEC |
| +0097 | 272   | 1  | 0 | 000 0000    | 0001 1000 0000 0000                     | N/A DISC            | 500.00  | MSEC |
| +0098 | 275   | 1  | 0 | 000 0000    | 0000000000000001                        | – – – –             | 500.00  | MSEC |
| +0099 | 267   | 1  | 0 | 000 0000    | 0000000000000001                        | – – – –             | 500.00  | MSEC |
| +0100 | 315   | 1  | 0 | 110 0000    | 0000 0000 1110 0001                     | 0.0000 knots        | 500.00  | MSEC |
| +0101 | 316   | 1  | 0 | 110 0110    | 1110 1010 0000 0001                     | 77.3438 Deg         | 500.00  | MSEC |
| +0102 | 276   | 1  | 0 | 000 0000    | 0000 0000 0000 0000                     | N/A DISC            | 500.00  | MSEC |
| +0103 | 260   | 1  | 0 | 00 01 01    | 93 01 –                                 | N/A DATE            | 500.00  | MSEC |
| +0104 | 031   | 1  | 0 | 00 1200     | 0 0 0 01                                | N/A CODE            | 550.00  | MSEC |
| +0105 | 114   | 1  | 0 | 110 0101    | 1000 0010 0010 0001                     | 61.9629 Deg         | 600.00  | MSEC |
| +0106 | 115   | 1  | 0 | 110 0101    | 1000 0010 0010 0001                     | 61.9629 Deg         | 600.00  | MSEC |
| +0107 | 116   | 1  | 0 | 110 0000    | 0000 0000 1110 0001                     | 0.0273 NM           | 600.00  | MSEC |
| +0108 | 313   | 1  | 0 | 110 0101    | 1000 0111 1010 0001                     | 62.1826 Deg         | 600.00  | MSEC |
| +0109 | 321   | 1  | 0 | 110 0000    | 0000 0000 0000 0001                     | 0.0000 Deg          | 600.00  | MSEC |
| +0110 | 261   | 1  | 0 | 000 0000    | 0000 0100 1010 0001                     | N/A DISC            | 600.00  | MSEC |

Fig. 6

VIRTUAL INTEGRATED SOFTWARE TESTBED FOR AVIONICS

FIELD OF THE INVENTION

The present invention generally relates to avionics, and more particularly relates to real-time embedded software used in avionics, and even more particularly concerns equipment for designing, testing and debugging such software for avionics.

BACKGROUND OF THE INVENTION

In the past, designers of real-time embedded avionics software have typically designed the software on a host computer by breaking the tasks down into separate programs for each line replaceable unit (LRU). Each LRU software program would be separately developed, compiled, and then downloaded into target hardware where it could be tested and debugged.

While this approach or similar approaches have been widely used in the past they have severe drawbacks. First of all, development of real-time embedded software typically requires the target computer to be halted to examine the state of processing, however, in a complex system it is often not possible to stop the target without simultaneously stopping the signals generated into the target computer since the missed signals may be crucial to the target computer once execution is resumed.

Secondly, test stations incorporating actual avionics equipment are generally expensive and must be shared among the entire software development team. For large systems employing many engineers, this often results in a bottleneck, since parallel development is limited by the hardware resources available.

Thirdly, typically software verification tests which test individual modules instead of the integrated software system are not as effective in testing functional requirements as are black box tests. Testing of functional requirements usually requires the coordinated operation of several software modules.

Fourthly, although testing software algorithms on a host computer is often much more efficient than embedded target testing, host-based testing alone usually cannot be used to determine compliance to requirements or to achieve FAA certification.

Fifthly, often, simulation programs become unmanageably complex as the number of simulated devices increases and the interactions between them increases in a non-linear proportion.

Lastly, development of embedded software systems is typically inefficient due to the need to develop, compile, and link on a host computer and then download the software into the target hardware to be tested and debugged.

Consequently, there exists a need for improvement in testing of avionics software.

SUMMARY OF THE INVENTION

It is an object of the present invention to shorten the development cycle of avionics software.

It is a feature of the present invention to provide a host-based testing system which uses partial simulation and actual equipment.

It is an advantage of the present invention to provide an avionics software engineer access to a testing environment which is readily reconfigurable.

It is another object of the present invention to improve the quality of avionics software.

It is another feature of the present invention to provide avionics software engineers with access to a testing environment which tests the integrated system software and not just one individual module.

It is another advantage of the present invention to provide a software engineer with increased and easier ability to test and debug avionics software at all stages during the software development.

The present invention provides a virtual integrated software testbed for avionics (VISTA), which is designed to satisfy the aforementioned needs, produce the earlier mentioned objects, contain the above described features and achieve the previously stated advantages. The invention is carried out through a "manual laboratory hardware rig-less" system in the sense that the avionics software is not tested manually solely on target hardware in a laboratory rig where numerous actual avionics LRUs are wired together. Instead, VISTA, is provided which contains a collection of highly detailed independent and hardware substitutable simulation programs for on-board sensors and cockpit instrumentation under the distributed control and synchronization of one or more computer processors with the ability to substitute actual avionics LRUs during the testing.

BRIEF DESCRIPTION OF THE DRAWINGS

The invention may be more fully understood by reading the following detailed description in conjunction with the appended drawings, wherein:

FIGS. 3A and 3B are graphic representations of simulated multifunctional displays containing graphic and tabular information which would be displayed on a work station monitor.

FIG. 6 is a graphic representation of a V_ARINC display window showing tabular information which would be displayed on a work station monitor.

DETAILED DESCRIPTION

Figure 1:
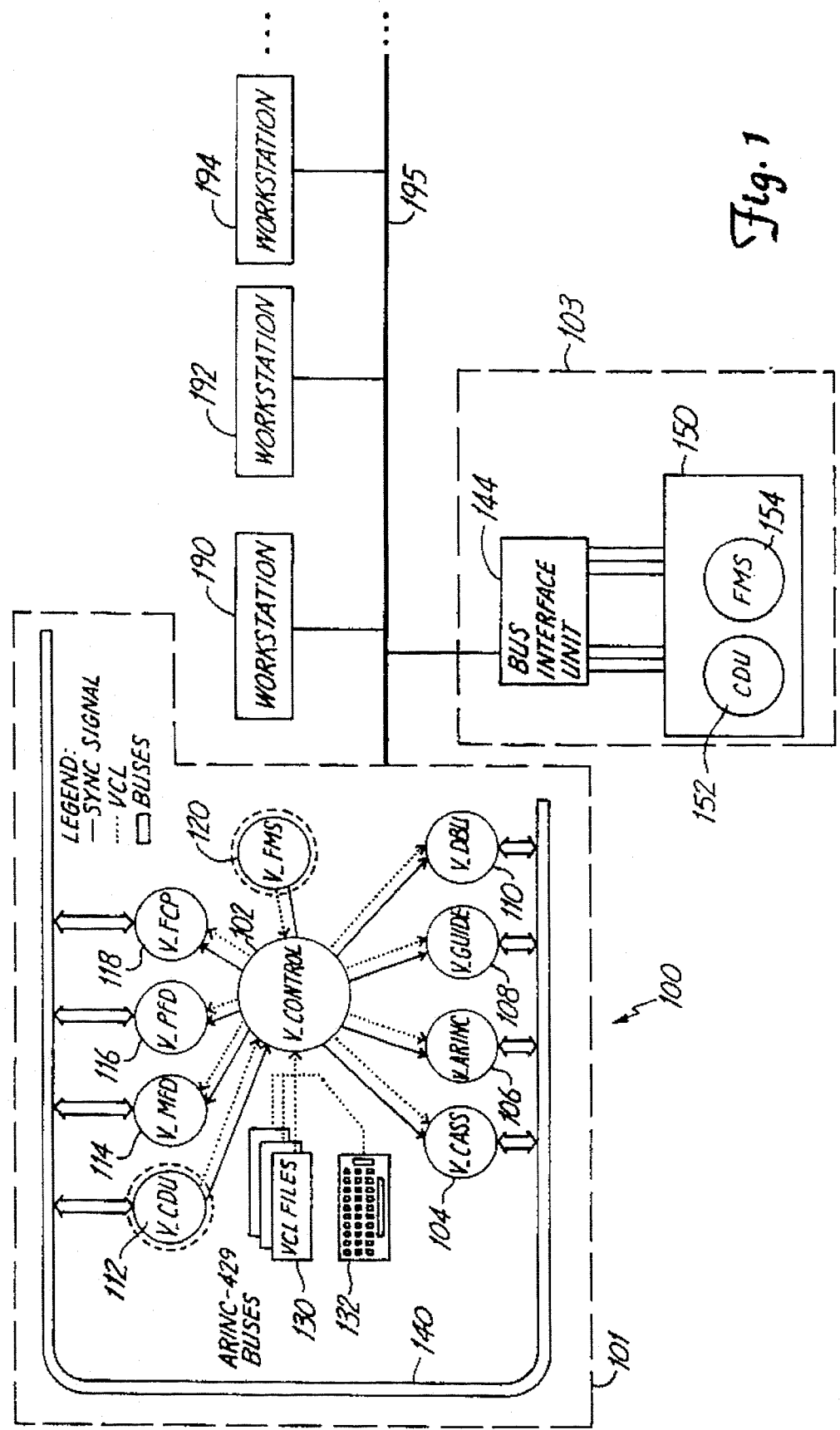
FIG. 1 is a schematic diagram of the apparatus and system of the present invention showing a host computer with a central module V_CONTROL with the independent removable process modules along with a bus interface unit with target hardware and several workstations.
Figure 2:
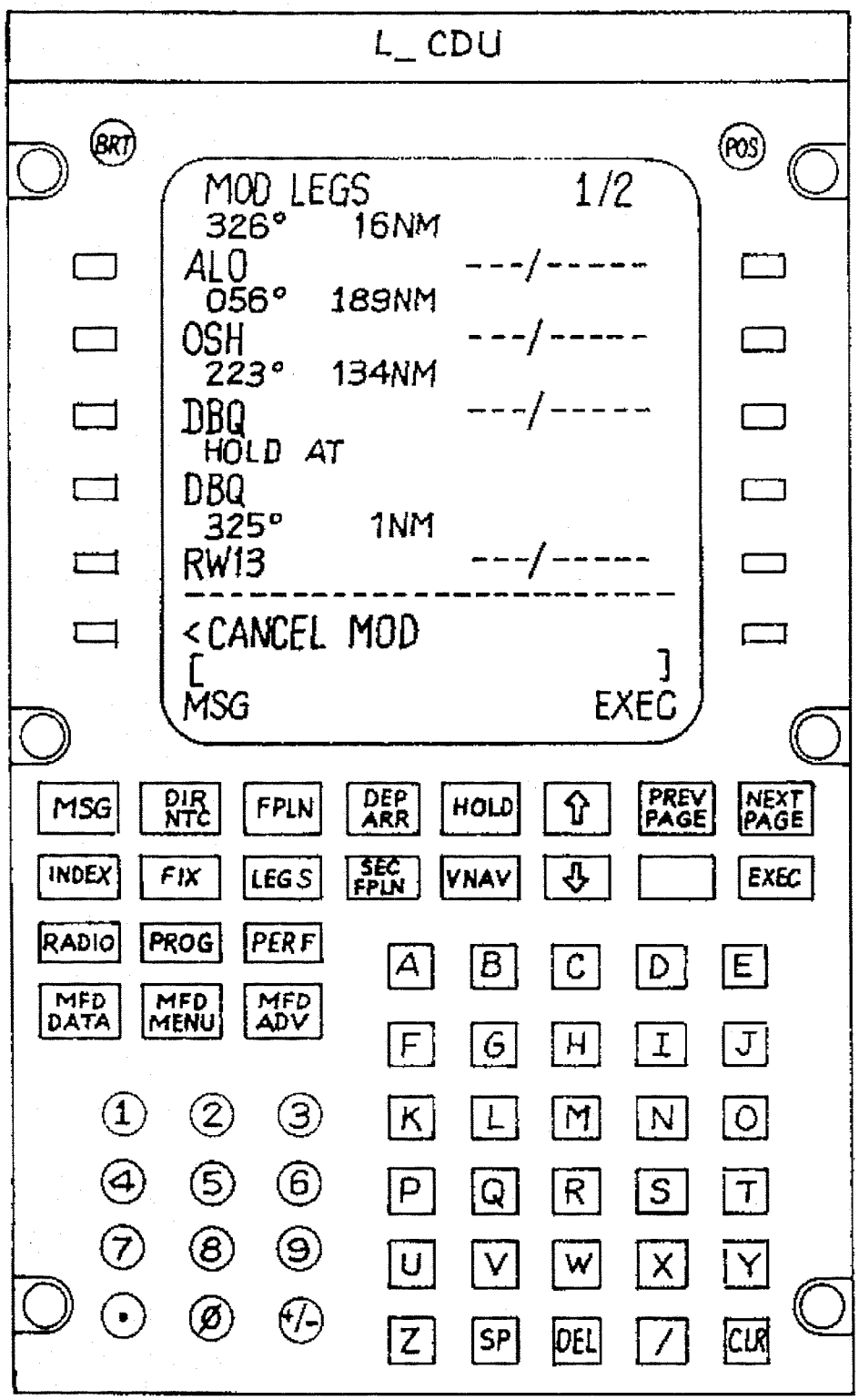
FIG. 2 is a representation of a representative simulated control display unit which is displayed upon a work station monitor.
Figure 3A:
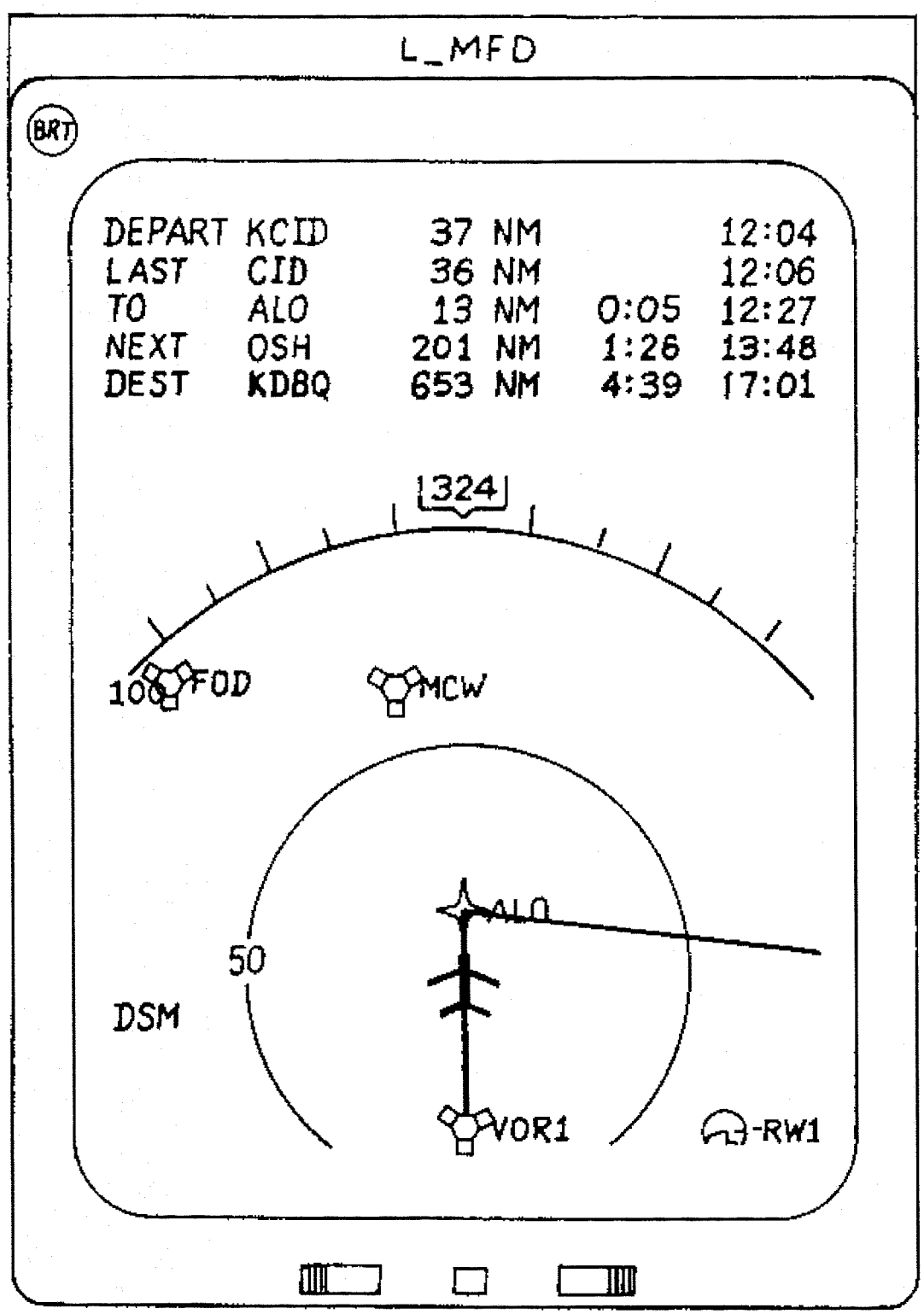
Figure 4:
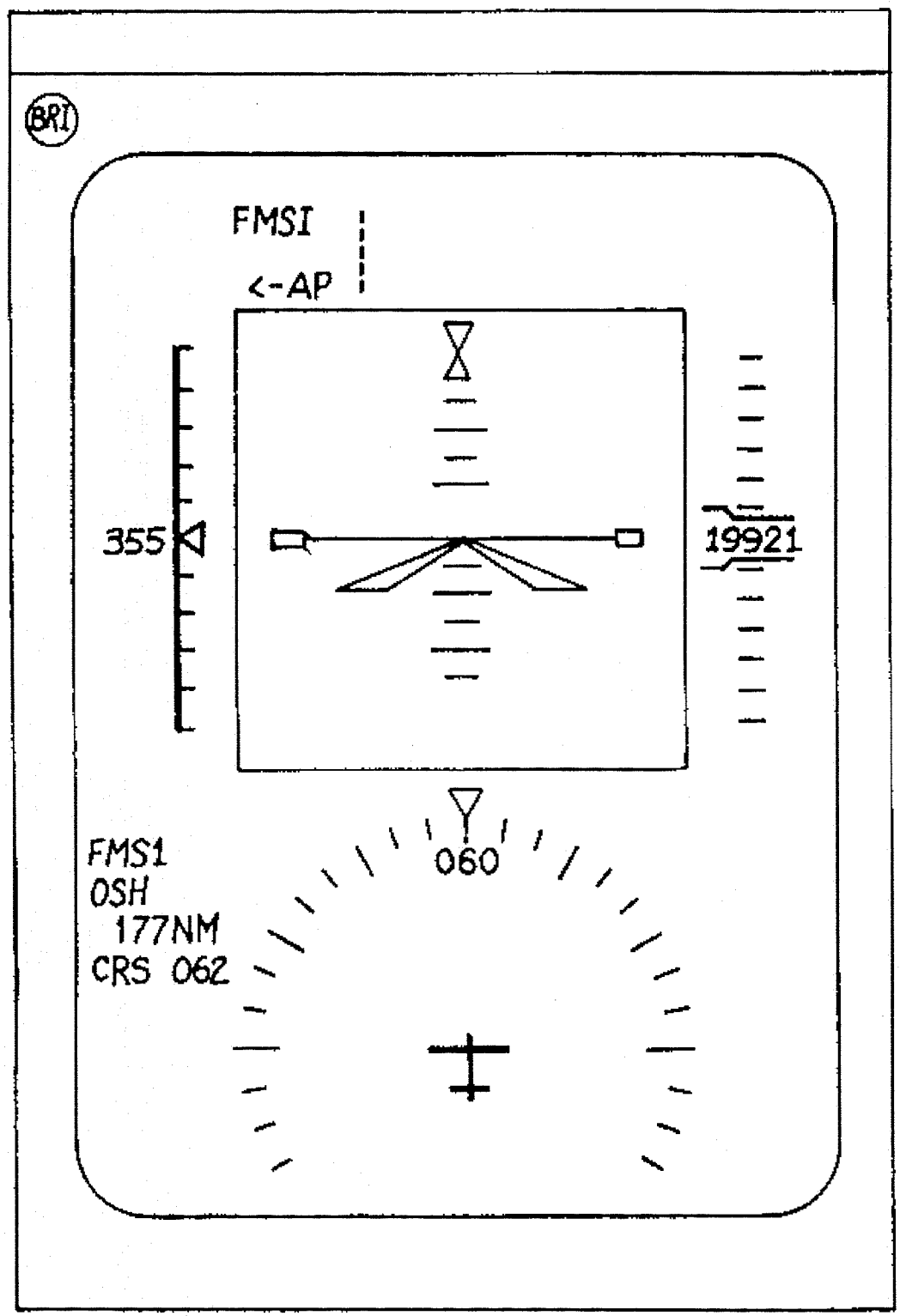
FIG. 4 is a graphic representation of a simulated primary flight display which might be displayed on a work station monitor.
Figure 5:
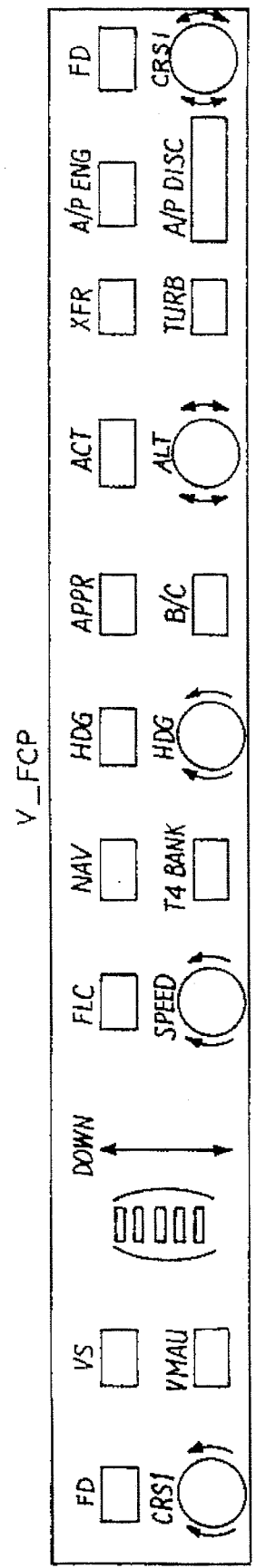
FIG. 5 is a graphic representation of a simulated flight control panel which would be displayed on a work station monitor.

Now referring to the drawings, wherein like numerals refer to like matter in text throughout, and more particularly now to FIG. 1, there is shown a VISTA, generally designated 100, having a host computer portion, shown within dotted line box 101, having a central module V_CONTROL 102 disposed therein and a bus interface/target hardware portion shown within dotted line 103. The host computer portion is preferably a DEC work station with a VMS operating system, however, other work stations with other operating systems could be utilized. Also shown within box 101 are numerous simulated avionics LRUs which are independent programs capable of removal from operation by V_CONTROL 102 and being substituted by actual target hardware or actual avionics LRUs in the target hardware rack 150. The CDU 112 and the FMS 120 are shown with dotted lines around them to represent that they are not currently being operated by V_CONTROL 102, but have their functions temporarily met by the actual avionics LRUs 152 and 154, respectively. This configuration is merely representative of the numerous other possible configurations. Any of the simulated LRUs can be replaced by actual LRUs so that the embedded real-time software therein, which was earlier tested as part of the simulated LRU, can now be tested as a part of the integrated system. A different LRU may be tested by removing one LRU from the rack 150, activating its simulated module, under V_CONTROL, and inserting a new LRU while deactivating its simulated module. The bus interface unit 144, can be a PC or other hardware device coupled to the host computer 101, which is capable of converting the simulated signals in the host computer to actual simulated signals on the hardware bus 160, which is preferably an ARINC-429 bus, RS 422, numerous discretes and analog lines. Also shown in FIG. 1 are workstations 190, 192, and 194 which are coupled to host computer 101 by network 195. Any one of these workstations 190, 192, and 194 could also be considered host computers and simultaneously run its own VISTA process.

The following disclosure includes a more detailed description of the VISTA system. It should be noted that the following details are believed to be merely examples of how the present invention might be best utilized.

VCL allows control of the aircraft model with virtual LRUs to create scenarios which exercise the full range of LRU and system capabilities. Also interactive VCL commands can also be journaled in a file thereby saving scenarios for future play back.

The V_CONTROL 102 utilizes distributed control and preferably merges VISTA command language directives from files, user input and from other VISTA processes. VISTA command language (VCL), commands not handled by V_CONTROL 102 are preferably routed to the process that does handle them and the control process waits for a response indicating a good command, erroneous command, or a test/pass fail result. The VCL contains a number of test commands that allow examination of virtual LRU status and virtual bus data which allows a completely automated test of avionics functions.

V_CONTROL 102 preferably supplies the simulation clock that controls the sequencing of all citrical processing that occurs in VISTA 100. V_CONTROL 102 signals each process or module to run and wait for a signal back when the process has completed its cycle. Due to this synchronized execution, the simulation can be stopped when one process reaches a debugger breakpoint, so that, when execution resumes all the simulated aircraft sensors are still synchronized. This permits real-time embedded systems to be developed on a host that is not sufficiently fast to run the system and all the simulated signals in real-time.

Preferably V_CONTROL 102 manages several other operations asynchronously to the processing of VCL. Error and information messages can be sent to the control process from any VISTA process, to be incorporated into the log and displayed to the user, in the case of error messages, recorded as test procedure failures. VCL commands can be sent from a file or user input source to the control process to be merged into the VCL stream currently being processed.

Coupled to V_CONTROL 102 is V_CASS 104, which represents VISTA commercial aircraft systems simulator, would preferably contain all the aircraft models and simulates ARINC-429 devices such as navigation sensors, radios and flight control computers. V_CASS 104 may simulate the following ARINC-429 devices found on most modern commercial jet aircraft:

| | |
|---|---|
| ADC | Air Data Computer |
| ADF | Automatic Direction Finder |
| AHRS | Attitude and Heading Reference System |
| CSU | Central Strapping Unit |
| DCP | Display Control Panel |
| DCU | Data Concentrator Unit |
| DME | Distance Measuring Equipment |
| FCC | Flight Control Computer |
| GPS | Global Positioning System |
| IOC | Input/Output Concentrator |
| IRS | Inertial Reference System |
| MLS | Microwave Landing System |
| PFD | Primary Flight Display (bus data only) |
| RTU | Radio Tuning Unit |
| TDR | Transponder |
| VHF | Very High Frequency receiver |
| VIR | VOR/ILS Receiver |
| VLF | Very low Frequency receiver |

Bus data from these simulated devices feed into the Input/Output Concentrator (IOC), which concentrates the data sent to the Flight Management System (FMS), as is done in actual aircraft. Normally, V_CASS 104 runs a dynamic simulation of these devices. It also allows the simulation to be turned off, in which case the fields of the ARINC-429 bus messages may be changed symbolically using VCL commands.

As mentioned above, it is possible to remove a device with a VCL command, and replace it with a different simulation of that device, or with the actual equipment by connecting hardware buses to virtual VISTA buses.

Preferably V_CASS 104 also encompasses a world-wide navigation data base of airports and Nay aids, such as DMEs and VORs. It generates data for a map display of the aircraft track and navigation data. The selection of which, if any, devices are grouped into V_CASS 104 is a matter of designer's choice. V_CASS 104 represents that some devices are more important to be simulated in independent fashion than others.

Three VISTA processes provide bus monitoring to display bus traffic as transmission occurs. V_ARINC 106 actually simulates a bus analyzer tool. It allows monitoring of ARINC data on up to four channels. Bus data may be displayed in multiple formats: ASCII, hexadecimal, binary, decimal or octal. In addition a data base may be set up to allow formatting of bus data and engineering units such as knots or degrees.

V_ARINC 106 allows the developer to set up trigger conditions and label acquisition lists to prepare for doing a trace, which may be saved to a file for later examination. V_ARINC 106 is coupled to V_CONTROL 102. Also coupled to V_CONTROL 102 is V_GUIDE 108 which comprises an independent implementation of the guidance control laws used by the flight management system. Preferably it receives the same bus data inputs required to perform the guidance computations, which it uses to compare the FMS outputs against the tolerance specified by a VCL test. Also coupled to module V_CONTROL 102 is V_DBU 110 which also provides bus monitoring to display bus traffic as transmission occurs and performs a similar function to V_ARINC 106 for the RS-422 bus that interfaces the FMS with the data base unit. Modules V_CDU 112, V_MFD 114, V_PFD 116 and V_FCP 118 are all coupled to V_CONTROL 102 and are essentially modules which emulate the appearance and signals output onto the buses of controlled display units, multifunctional displays, primary flight displays, and flight control panels, respectively. Also coupled to V_CONTROL 102 are FMS_NAV 120 and FMS_IO 122. Preferrably modules 120 and 122 include actual software which would be used in FMS hardware also shown coupled to V_CONTROL 102 or VCL files 130 and keyboard 132. VCL files are files of VISTA command language (VCL), statements. VCL is preferably a customized computer software language for use with V_CONTROL 102. Any computer language which is compatible with the modules can be utilized and the exact selection of any software language for any software in any of the modules is a matter of the designers choice. The applicants believe that ADA is a preferred software language for much of the VISTA applications, however certainly other languages can be utilized.

Encircling the modules and interconnecting the modules is bus 140 which is an emulation of ARINC-429 buses.

Now referring to FIGS. 2, 3A, 3B, 4 and 5. There are shown graphic representations of simulated control display units (CDUs), simulated multifunctional displays with graphic data, and simulated multifunctional displays with tabular data, simulated primary flight display (PFD) and simulated flight control panel (FCP). These instruments are types which are commonly found in airplane cockpits and are graphically represented in VISTA. Each instrument is a highly detailed simulation by use of software of on-board sensors and cockpit instruments. Each instrument is an independent VMS process under the control of a simulation clock in V_CONTROL 102. When the VMS processes that execute each of these increment programs are invoked, virtual connections are created between the simulated instruments and simulated buses.

The indicator portions of these units are refreshed with updated data at the same rate as the real line replaceable units (LRUs). The "buttons" on the control portion of these indicators can be pressed by pointing and clicking a mouse on the work station.

The primary benefit of having these simulated displays available is providing a window to the operation of the FMS software. Many changes to the program under development are immediately apparent under these indicators, giving engineers feedback that either validates modifications or points up areas that require further effort. Where as a debugger allows spot checking of certain variable values that might be of interest for examining a particular function, the instruments from a visual monitoring of parameters in the context of the entire system. This helps developers find problems that they are not necessarily looking for, as they run VISTA to check out a given feature but in the process notice something that looks unusual.

Now referring to FIG. 6. There is shown a graphic representation of a V_ARINC display window which shows the bus traffic from a V_ARINC session.

It is thought that the present invention and many of its attendant advantages will be understood from the aforegoing description, and it will be apparent that various changes may be made in the form, the construction and the arrangement of the parts, without departing from the spirit and scope of the invention or sacrificing all of their material advantages. The form herein described is merely a preferred or exemplary embodiment thereof.

We claim:

1. An avionics software test apparatus comprising:

a flight management system (FMS) module for emulating a predetermined flight management system on an aircraft, said flight management system module utilizing software included in a predetermined flight management system and generating in real-time simulated FMS bus signals;

a primary flight display (PFD) module for emulating a predetermined PFD on an aircraft, said primary flight display module utilizing software included in said PFD and generating in real-time simulated PFD bus signals;

a control display unit (CDU) module for emulating a predetermined CDU on an aircraft, said control display unit module utilizing software included in said CDU and generating in real-time simulated CDU bus signal;

a multifunctional display (MFD) module for emulating a predetermined MFD on an aircraft, said multifunctional display module utilizing software in said MFD and generating in real-time simulated MFD bus signals;

a bus module for emulating a predetermined bus on an aircraft;

a bus breakout panel for receiving line replaceable unit hardware from a predetermined aircraft;

a test hardware bus;

a host computer for operating a control module which exercises distributed control over and synchronizing the operation of said flight management system module, said primary flight display module, said control display unit module, said multifunctional display module and said bus module, a bus interface unit coupled to said host computer for converting said simulated FMS bus signals, said simulated PFD signals, said simulated CDU bus signals and said simulated MFD bus signals to actual signals on said test hardware bus;

an avionics line replaceable unit (LRU) with real-time embedded software therein coupled to said test bus for receiving said actual signals from and providing target hardware signals to said test hardware bus.

2. A method of testing avionics software comprising:

providing a plurality of avionics line replacement unit (LRU) software modules;

emulating a plurality of avionics LRUs with said avionics LRU software modules;

testing said avionics LRU software modules on a host computer; and, selectively ceasing emulation of at least one of said plurality of avionics LRUs and replacing said at least one of said plurality of avionics LRUs with an actual avionics LRU, with one of said plurality of software modules therein, and testing said actual avionics LRU in an integrated systems environment.

* * * * *